Aug. 12, 1969
T. FOHL
3,460,384
DEPTH CONTROLLING DEVICE
Filed June 6, 1967
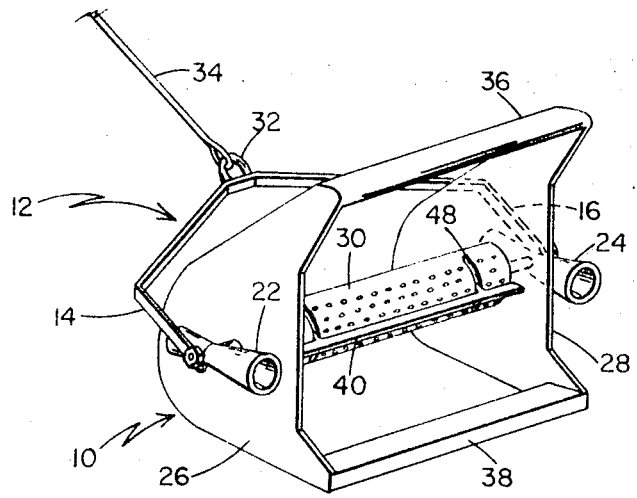
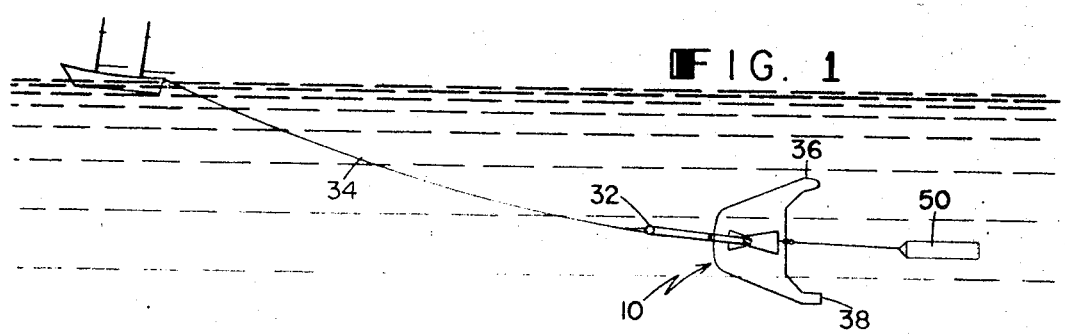
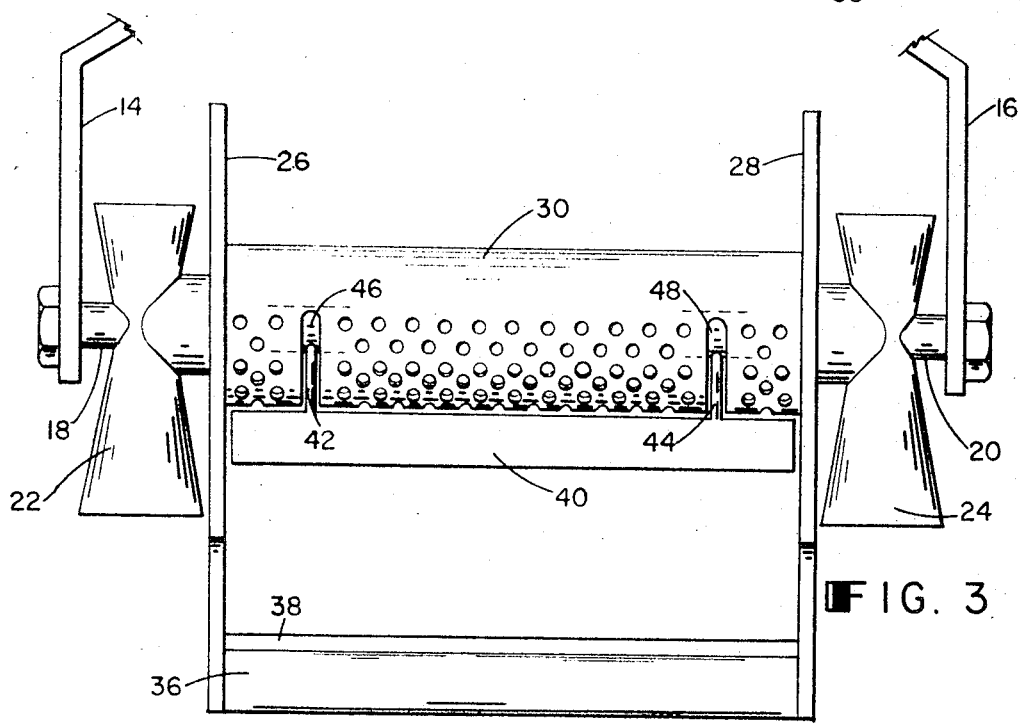

United States Patent Office 3,460,384
Patented Aug. 12, 1969

3,460,384
DEPTH CONTROLLING DEVICE
Timothy Fohl, East Acton, Mass., assignor to Harry Eugene Stubbs, Lexington, Mass.
Filed June 6, 1967, Ser. No. 643,907
Int. Cl. G01w 1/00
U.S. Cl. 73—170         13 Claims

ABSTRACT OF THE DISCLOSURE

A depth control device for a submerged object which includes an adjustable boundary layer control coating with a liquid contacting surface of the structure.

---

This invention relates to controlling the depth of objects (e.g. fishing nets or oceanographic instruments) advancing submerged through a body of water.

Objects of the invention are to provide a device that is highly responsive, accuartely controllable, reliable, has a high lift coefficient, and is small, simple, and inexpensive.

In general, the invention features a framework, a tow portion, and a depth control assembly including a water contacting surface and a boundary layer control for the layer of water contacting the surface, the assembly being adjustable to a plurality of modes corresponding respectively to different lifts. In preferred embodiments the water contacting surface (preferably cylindrical with a horizontal axis perpendicular to the direction of movement through the water) has a perforated convex portion directed away from the direction of movement through the water; a pump (preferably a venturi tube) is provided to maintain behind the convex portion a pressure lower than the ambient water pressure in the layer of water contacting the surface, so that water in the layer is drawn through the perforations; and a flow divider (preferably a movable flap) is adjustable to a plurality of positions adjacent the convex portion to control the separation from the surface of water flowing along the convex portion.

Other objects, features, and advantages of the invention will be apparent from the following description of a preferred embodiment thereof, taken together with the drawings, in which:

FIG. 1 is a somewhat schematic view of a depth control device of the invention under tow by a ship;

FIG. 2 is a perspective view of the depth control device; and

FIG. 3 is a top plan view of the device of FIG. 2.

Depth control device 10 includes bridle 12 with its legs 14, 16 respectively pivoted on shafts 18, 20 between which are mounted venturi tubes 22, 24, end plates 26, 28, and hollow cylinder 30. Bridle 12 is connected at its forward end through link 32 to tow cable 34 for advancement through the water. End plates 26, 28 support between their upper portions float 36 and between their lower portions weight 38, the weight and float being symmetrically streamlined so as not to produce lift forces other than by their buoyancies.

The portion of cylinder 30 directed away from the direction of movement through the water is perforated.

Flap 40 extends along the length of the cylinder adjacent the perforations and is supported by mounts 42, 44 movable in slots 46, 48 to vary the position of the flap above and below the horizontal plane of the cylinder axis. A motor (not shown) and associated cable to the boat may be provided for adjustment of the flap.

The axes of tubes 22, 24 are directed along the direction of movement through the water, and their necks communicate with the interior of the cylinder.

The densities and sizes of the weight and the float are chosen so that, when flap 40 is in the horizontal plane of the cylinder axis, the upward pull of the tow cable when the device is under tow is exactly offset.

In operation device 10 is towed behind a boat by cable 34 and in turn tows the object 50 the depth of which is to be controlled. Float 36 and weight 38 maintain the stability of device 10, which has no effect on the depth of object 50 so long as flap 40 is in the horizontal plane of the cylinder axis. Water flows over and under the cylinder and parts from its surface at flap 40. Venturi tubes 22, 24 keep the pressure inside the cylinder below the ambient water pressure at the cylinder's surface, so that the boundary layer of water is drawn through the perforations. Adjustment of flap 40 below the horizontal plane changes the line of separation of water from the cylinder to produce upward lift, raising object 50. Adjustment of flap 40 above the horizontal plane produces downward lift, lowering object 50. The magnitude of the lift force increases with the distance of the flap from the horizontal plane. Plates 26, 28 reduce water flow around the ends of the cylinder, thereby increasing lift forces.

Other embodiments will occur to those skilled in the art and are within the following claims.

What is claimed is:

1. A device for controlling the depth of an object moving submerged through a body of water comprising:
   a framework,
   a tow portion, and
   a depth control assembly including:
      a water contacting surface, and
      a selectively adjustable boundary layer control for the layer of water contacting said surface, said control cooperating with said surface to selectively modify the boundary layer at particular portions of said surface without requiring any change in the velocity of said device through said water,
   said assembly being adjustable to a plurality of modes corresponding respectively to different adjustments of said boundary layer control to provide different lifts.

2. The device of claim 1 wherein said surface has a perforated portion, and a pump is provided for maintaining behind said surface portion a pressure lower than the ambient water pressure in said layer, whereby water in said layer is drawn through the perforations in said perforated portion.

3. The device of claim 2 wherein said perforated portion is directed away from the direction of movement through said water.

4. The device of claim 1 wherein said water contacting surface is the surface of a member having an axis, said member being of circular cross section in all planes perpendicular to said axis.

5. The device of claim 4 wherein said axis lies in a horizontal plane.

6. The device of claim 4 wherein said axis is perpendicular to the direction of movement through said water, the portion of said surface directed away from said direction of movement is perforated, and a pump is provided for maintaining behind said surface portion a pressure lower than the ambient water pressure in said layer.

7. The device of claim 6 wherein said surface is cylindrical.

8. The device of claim 2 wherein said pump is a venturi tube carried by said device with its axis directed along the direction of movement through said water and its neck communicating with the zone behind said perforated surface portion.

9. The device of claim 1 wherein said surface has a convex portion directed away from the direction of movement through said water, and said assembly includes a flow divider adjustable to a plurality of positions adjacent said convex portion to control the separation from said surface of water flowing along said convex portion.

10. The device of claim 9 wherein said convex portion is perforated and a pump is provided for maintaining behind said convex portion a pressure lower than the ambient water pressure in said layer.

11. The device of claim 10 wherein said surface is cylindrical about a horizontal axis and said divider is a flap parallel to said axis and adjustable above and below the horizontal plane of said axis.

12. The device of claim 1 further comprising end plates at the ends of said water contacting surface to reduce water flow therearound.

13. The device of claim 1 further comprising a stabilizer for maintaining the orientation of said surface.

References Cited

UNITED STATES PATENTS 3,106,437 10/1963 Michalski.
3,137,264 6/1964 Brainard et al.

RICHARD C. QUEISSER, Primary Examiner

J. W. MYRACLE, Assistant Examiner

U.S. Cl. X.R.

114—235

Disclaimer 3,460,384.—*Timothy Fohl*, East Acton, Mass. DEPTH CONTROLLING DEVICE. Patent dated Aug. 12, 1969. Disclaimer filed Aug. 27, 1969, by the assignee, *Harry Eugene Stubbs*.

Hereby disclaims the terminal portion of the term of the patent subsequent to Oct. 7, 1985.

[*Official Gazette October 7, 1969.*]